No. 866,836. PATENTED SEPT. 24, 1907.
R. S. BELL.
WINDMILL.
APPLICATION FILED JAN. 3, 1907.
2 SHEETS—SHEET 1.
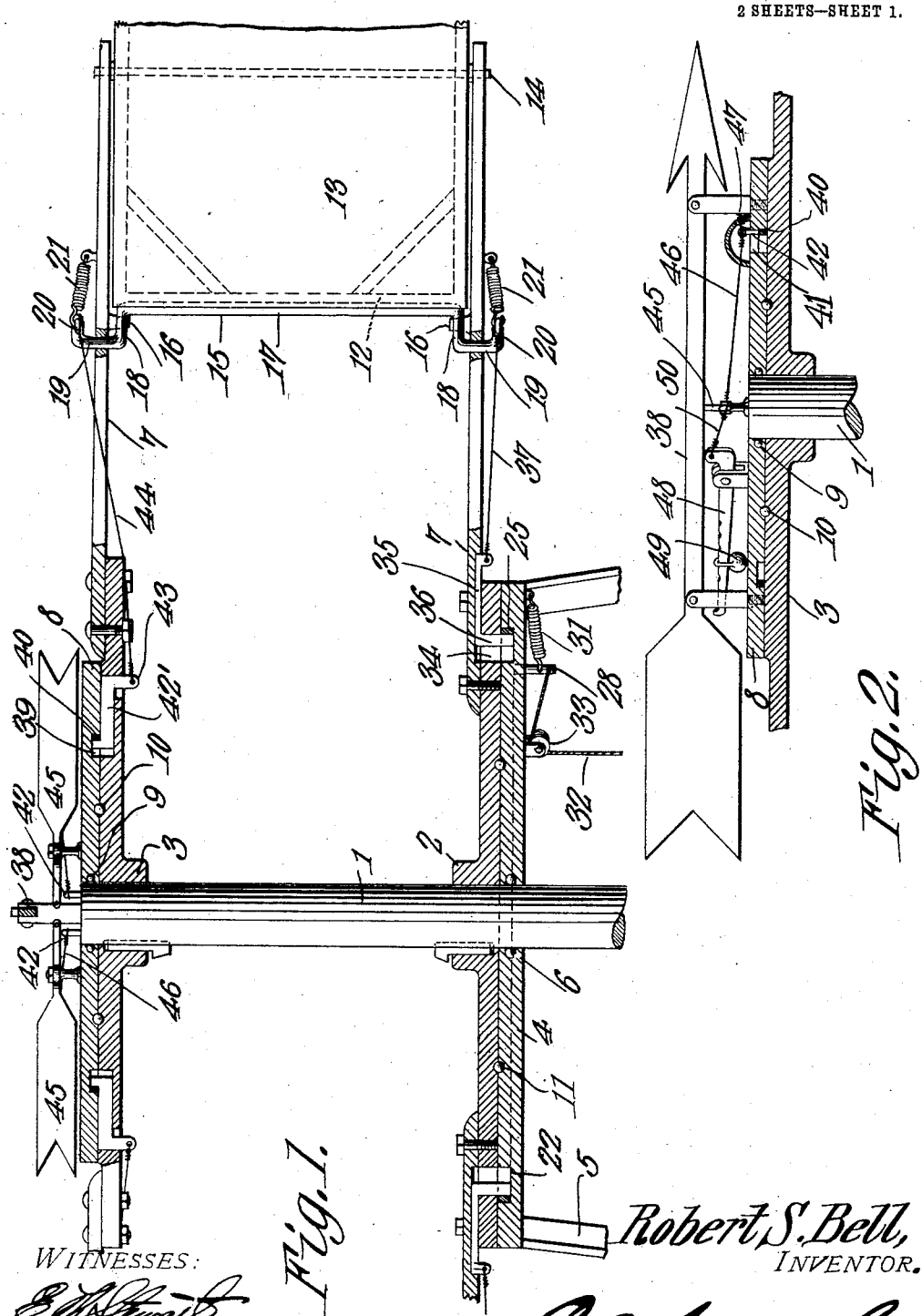
WITNESSES:
Robert S. Bell,
INVENTOR.
By C. A. Snow & Co.
ATTORNEYS No. 866,836. PATENTED SEPT. 24, 1907.
R. S. BELL.
WINDMILL.
APPLICATION FILED JAN. 3, 1907.
2 SHEETS—SHEET 2.
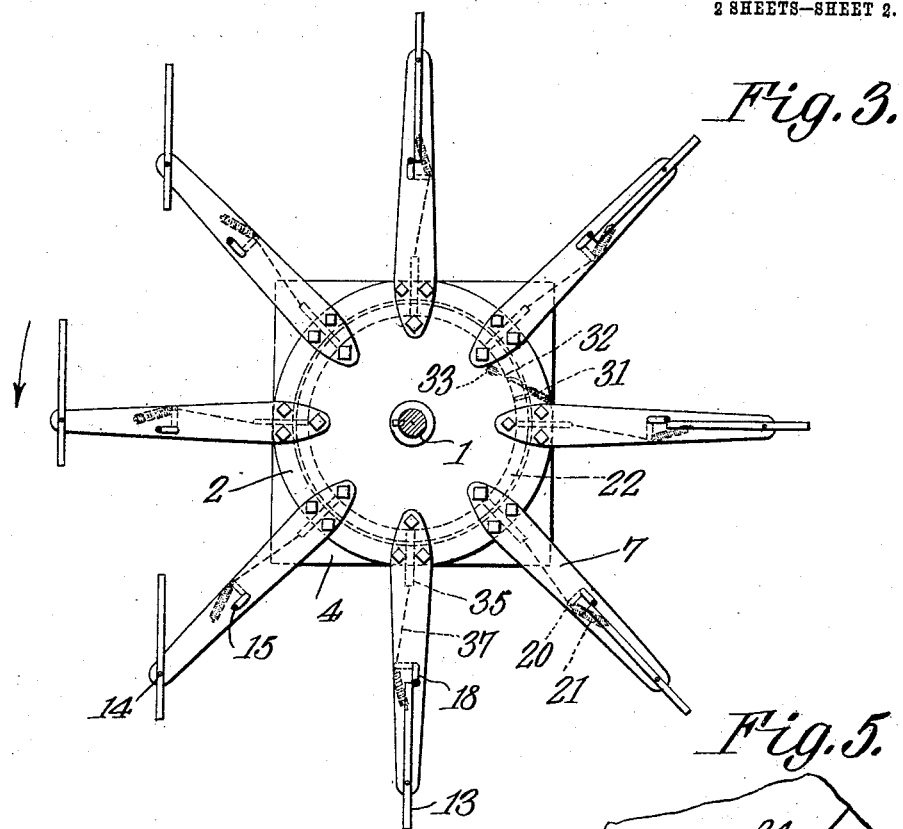
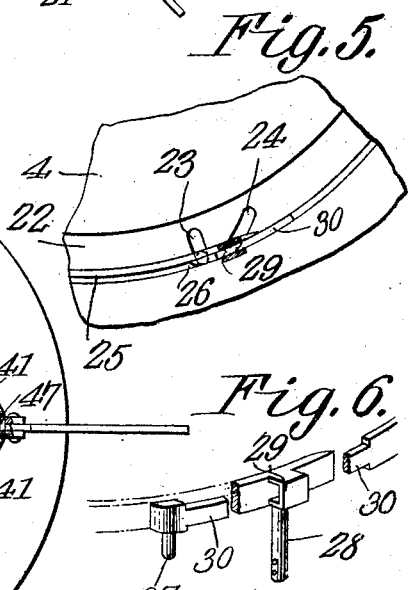
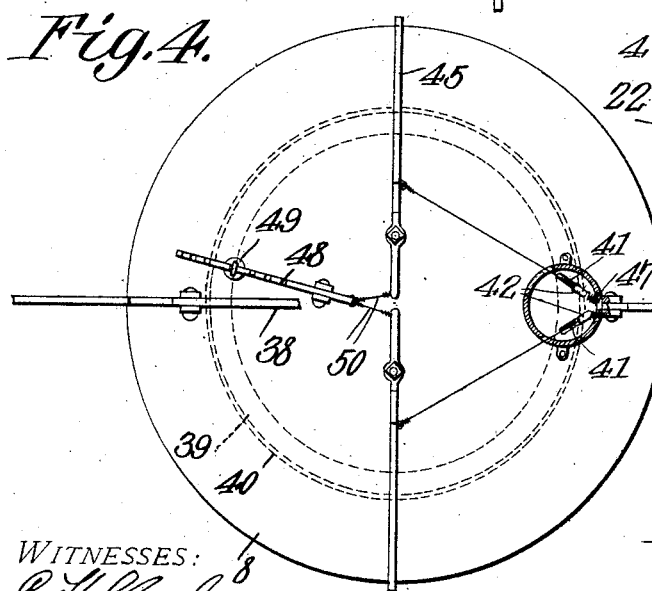
Robert S. Bell,
INVENTOR.
WITNESSES:
By C. A. Snow & Co.
ATTORNEYS

UNITED STATES PATENT OFFICE.

ROBERT SNOWDEN BELL, OF TUCUMCARI, TERRITORY OF NEW MEXICO.

WINDMILL.

No. 866,836.　　　Specification of Letters Patent.　　　Patented Sept. 24, 1907.

Application filed January 3, 1907. Serial No. 350,584.

*To all whom it may concern:*

Be it known that I, ROBERT SNOWDEN BELL, a citizen of the United States, residing at Tucumcari, in the county of Quay and Territory of New Mexico, have invented a new and useful Windmill, of which the following is a specification.

This invention has relation to wind mills and it consists in the novel construction and arrangement of its parts as hereinafter shown and described.

The object of the invention is to provide a mill of the character indicated having sails pivotally mounted between parallel arms which rotate about a vertical axis in such manner that the sails present flat sides toward the wind in one direction and their edges toward the wind when moving in the opposite direction so that the back pressure upon the sails is reduced to a minimum and the full force of the wind may be utilized for operating the mill. Normally the parts are arranged so that the sails will operate as above indicated but when it is desired that the mill should not operate at all, or rather that the sails should not present their sides to the wind means is provided for removing stops located upon the arms in the paths of the edges of the sails whereby all of the sails may present their edges to the wind and consequently the said arms will not be rotated. Means is also provided for accomplishing the last above mentioned operation should the velocity of the wind become excessive. The last said means operates automatically and as soon as the velocity of the wind reduces the means automatically operates to project the stops into the paths of the edges of the sails whereby the mill may automatically begin operation again.

With the above objects in view the mill consists of the special construction and arrangement of its parts as hereinafter described in detail.

In the accompanying drawing:—Figure 1 is a vertical sectional view of the wind mill. Fig. 2 is a vertical sectional view of the top of the mill cut at right angles to Fig. 1. Fig. 3 is a horizontal sectional view of the wind mill. Fig. 4 is a top plan view of the mill with parts removed and parts broken. Fig. 5 is a detail view of a portion of the platform of the mill, and Fig. 6 is a detail perspective view of the overlapping ends of the lower hoop of the mill.

The mill comprises the vertical shaft 1 journaled for rotation and to which is keyed the lower plate 2 and the upper plate 3. The platform 4 is fixed at the upper end of the mill structure 5 and is held stationary. The shaft 1 passes through the said platform 4 and is separated from the same by a ball-bearing 6 of usual construction. The arms 7, 7 are arranged in pairs, the members of which are vertically disposed with relation to each other and horizontally disposed with relation to the plates 2 and 3. The inner ends of the said arms 7 are fixed to the said plates 2 and 3. As many sets of arms 7 may be provided as desired. The plate 8 is located above the plate 3 and is provided with a central perforation which receives the shaft 1. While the said plate 8 is not stationary it does not rotate with the shaft 1 but is separated from the same by a ball-bearing 9. The ball-bearing 10 is interposed between the plates 3 and 8 and the ball-bearing 11 is interposed between the plates 2 and platform 4. The frames 12 of the sails 13 are provided with the vertically disposed shafts 14 which are journaled at their ends in the vertically opposite arms 7, 7. The said sails are preferably made of canvas but any other suitable material may be employed. The shafts 14 are not medially located with relation to the frames 12 but are located to one side of the median lines thereof.

The stop rods 15 are of peculiar configuration and are journaled at their upper and lower portions in the arms 7, 7. The lugs 16, 16 are located upon the arms 7, 7 and are adapted to limit the rotary movement of the said stop rods 15. Each stop rod is provided with the vertically disposed intermediate portions 17 and the horizontal portions 18, the trunnion portions 19 and the outstanding portions 20. The coil springs 21 are attached at their ends to the arms 7 and also connect with the outstanding portions 20 of the stop rods 15. The tension of the said springs is such as to have a tendency to maintain the horizontal-portions 18 in contact with the lugs 16 and the intermediate portions 17 in the path of the edge of the sail 13. When the intermediate portion 17 is in engagement with the lugs 16 the distance from the said portion to the journal bearings of the sail frame shaft 14 is less than the distance from the said sail frame shaft to the vertical edge of the sail frame across the median line thereof. Consequently the said intermediate portion 17 lies within the path of the said edge of the sail frame and will prevent the said sail frame from describing a complete rotation.

The platform 4 is provided in its upper surface with an annular recess 22. Said recess is provided in its bottom with a radially extending opening 23 and in the vicinity of said opening with an inclined or curved opening 24. The inner ends of said openings terminate about midway of the breadth of the recess 22. The band or hoop 25 is located upon edge in said recess 22 and the ends of the said hoop overlap as at 26. One end of the hoop 25 is provided with a pin 27 which is located in the opening 23 and the other end of the hook 25 is provided with a pin 28 which is located in the opening 24. The loop 29 is attached to the end of the hoop 25 which carries the pin 28. Said loop 29 receives the vertically reduced portion 30 of the said hoop 25 and said portion 30 may slide longitudinally through the said loop 29. The end of the hoop 25 which carries the loop 29 is reduced in transverse thickness gradually and terminates in an edge at the end. The pin 28 projects below the lower surface of the platform 4 and one end of the coil spring 31 is attached to said pin and the other end of the said spring 31 is attached to the platform 4 in the vicinity of the outer end of the opening 24. The tension of the said spring is such as to have a tendency to hold the pin at the outer end of the opening 24. Consequently the hoop 25 is normally expanded and lies in the outer portion of the annular recess 22. The pull wire 32 is attached at one end to the pin 28 and passes over the pulley 33 which is hung to the platform 4. Said pulley 33 is located at a point substantially in alinement with the opening consequently, when the said wire 32 is pulled the spring 31 is elongated and the hoop 25 is contracted and moved into the intermediate portion of the recess 22.

The plate 2 is provided with a series of perforations 34 which are arranged in a circle and which lie over the annular recess 22. The slides 35 are located at the lower arms 7 and are provided with downwardly extending ends 36 which pass through the perforations 34 of the plate 2 and which enter the recess 22 and bear against the inner side of the hoop 25. A wire 37 is attached to each of the slides 35 and the outer end of each of said wires is attached to one of the lower outstanding ends 20 of a stop rod 15. Thus, it will be seen that when the hoop 25 is contracted as above described that the slides 35 will be moved toward the center of the platform 4 and through the wires 37, the stop rods 15 will be turned upon their trunnion portions so that the intermediate portions 17 thereof will be swung out of the paths of the edges of the sails 13, thus leaving the said sails free to rotate upon the shafts 14 whereby their edges will always be presented to the wind and not their lateral sides. Thus the wheel is thrown out of gear. When the wire 32 is released the spring 31 will expand the hoop 25 and the springs 21 will turn the portions 17 of the stop rods 15 into the paths of the edges of the sails 13.

The wheel is provided with an automatic governor which will prevent the wheel from rotating at an excessive rate of speed. The governor comprises the plate 8 before mentioned and the vane 38 mounted thereon which always remains in alinement with the wind and which thus substantially fixes or holds the plate stationary. The plate 8 is provided in its under side with an annular recess 39 in which is located a hoop 40. The ends of the hoop overlap as does the ends of the hoop 25 and the said hoops operate in much the same manner. The recess 39 is provided with the openings 41, through which the pins 42 pass. Said pins in turn are carried by the ends of the hoop 40. The slides 42' are provided with upstanding ends which lie against the inner surface of the hoop 40 and are also provided with the downwardly extending ends 43 each of which is connected by means of a wire 44 with the upper outstanding end 20 of a stop rod 15. Thus it will be seen that as the slides 42' are drawn toward the center of the plate 8 that the edges of the sails 13 will be liberated from the stop rods 15. The vanes 45 are pivoted upon the top of the plate 8 and are arranged to turn horizontally upon their pivots. A vane 45 is located on each side of the vane 38. The wires 46 connect the vanes 45 with the pins 42. The coil springs 47 are attached to the pins 42 and the plate 8 and tend to keep the pins 42 at the outer ends of the openings 41. The lever 48 is fulcrumed upon the top of the plate 8 and is provided at its power end with an adjustable weight 49 and its work end is connected by means of the wires 50 with the vanes 45 at opposite sides of the pivots thereof from the points of connection of the wire 46 therewith. Thus it will be seen that when the velocity of the wind becomes excessive the vanes 45 (which normally have their sides to the wind) will turn upon their pivots and, through the wires 46 will contract the hoop 40 and at the same time, through the wires 50 will elevate the weighted end of the lever 48. As the wind subsides the weight 49, actuated by gravity and through the lever 48 and wires 50 will turn the vanes 45 upon their pivots into their normal positions.

Thus it will be seen that an automatic mill or wheel of the nature indicated is so provided that the flat sides of the sails are normally presented to the wind at that side of the wheel which is turning with the wind and that the edges of the sails are presented to the wind at that side of the wheel which is turning against the wind. The parts may be operated to have the edges of the sails at all times to the wind and the latter operation is automatically accomplished should the velocity of the wind become excessive.

Having described my invention what I claim as new and desire to secure by Letters Patent is:—

1. In a wind mill, arms mounted for rotation about an axis, a sail pivoted between said arms and a stop-rod journaled between the arms in parallel relation to said axis and adapted to lie in the path of the sail.

2. In a wind mill, arms mounted for rotation about an axis, a sail pivoted between the arms, a spring retained stop-rod journaled between the arms in parallel relation to the said axis and adapted to lie in the path of the sail.

3. In a wind mill, arms mounted for rotation about an axis, a sail pivoted between the arms, a stop-rod having an intermediate portion adapted to lie in the path of the sail with horizontal portions at the ends thereof and trunnion portions journaled in said arms, an outstanding portion formed at the end of said trunnion portions, a means for turning the stop-rod attached to said outstanding portions and a spring attached to said portions for retaining the stop-rod.

4. In a wind mill, rotating arms, sails mounted thereon, stops for the sails, a relatively fixed plate having an annular recess, an expansible hoop located in the recess, means for expanding and contracting the hoop and means operatively connecting said hoop with the stops for the sails.

5. In a wind mill, rotating arms, sails mounted thereon, stops for the sails, a relatively fixed plate having an annular recess, a hoop having overlapping ends located in said recess, means for expanding and contracting the hoop and means operatively connecting said hoop with the stops for the sails.

6. In a wind mill, rotating arms, sails mounted thereon, stops for the sails, a relatively fixed plate having an annular recess, an expansible hoop located in the recess, means for expanding said hoop and for holding the same expanded, means for contracting the hoop and means operatively connecting said hoop with the stops for the sails.

7. In a wind mill, rotating arms, sails mounted thereon, stops for the sails, a relatively fixed plate having an annular recess with openings therein, a pulley supported thereby a hoop having overlapping ends provided with pins which are located in said openings, a spring attached to one of said pins and a pull wire attached to the said pin and passing over said pulley and means operatively connecting the hoop with the stops for the sails.

8. In a wind mill, rotating arms, sails mounted thereon, stops for the sails, a relatively fixed plate having an annular recess with openings therein, one of which is radially disposed and the other substantially tangentially disposed, an expansible hoop having overlapping ends provided with pins which are located in said openings, a spring connecting with the pin located in the tangentially disposed opening, a wire attached to said pin and a means operatively connecting said hoop with the stops for the sails.

9. In a wind mill, rotating arms, sails mounted thereon, stop-rods for the sails, a relatively fixed plate, slides mounted thereon, means operatively connecting said slides with the stop-rods and means for moving said slides and swinging the stop-rods.

10. In a wind mill, rotating arms, sails mounted thereon, stop-rods for the sails, slides supported for rotation about a fixed axis, a relatively fixed plate, means mounted upon said plate for moving the slides and means operatively connecting said slides with said stop rods.

11. In a wind mill, arms mounted for rotation about an axis, a sail pivoted between said arms, a stop-rod for the sail, means for manually moving said stop-rod and a wind operated means for moving said stop-rod.

12. In a wind mill, arms mounted for rotation about an axis, a sail pivoted between said arms, a swinging stop-rod for the sail carried by the arms, means for swinging said stop-rod manually and an elevated wind-actuated means operatively connected with the stop-rod for swinging the same.

13. In a wind mill, arms mounted for rotation about an axis, a sail pivoted between said arms, a swinging stop-rod for the sail, a relatively fixed plate journaled upon the shaft of the mill and a vane fixed to said plate, said plate having wind-operated means operatively connected with the stop-rod for swinging the same.

14. In a wind mill, arms mounted for rotation about an axis, a sail pivoted between the arms, a swinging stop-rod for the sail carried by the arms, a relatively fixed plate journaled upon the shaft of the mill, a vane fixed to said plate, vanes pivoted to said plate at opposite sides of the first said vane, means for holding the last said vanes at an angle to the first said vane and means connecting the last said vanes with the stop-rod.

15. In a wind mill, arms mounted for rotation about an axis, a sail pivoted between the arms, a swinging stop-rod for the sail carried by the arms, a relatively fixed plate journaled upon the shaft of the mill, wind-operated means carried by the said plate, an expansible hoop carried by the plate and being operatively connected with said means and means operatively connecting said hoop with said stop-rod.

In testimony that I claim the foregoing as my own, I have hereto affixed my signature in the presence of two witnesses.

ROBERT SNOWDEN BELL.

Witnesses:
HARRIET E. BELL,
J. V. GALLEJOS.